(12) United States Patent
Wang (10) Patent No.: US 6,626,050 B1
(45) Date of Patent: Sep. 30, 2003

(54) METHOD FOR IMPROVING MONITORED RANGE OF FLOW SENSOR

(75) Inventor: Chih-Wen Wang, Hsinchu (TW)

(73) Assignee: United Microelectronics Corp., Hsinchu (TW)

( * ) Notice: Subject to any disclaimer, the term of this patent is extended or adjusted under 35 U.S.C. 154(b) by 0 days.

(21) Appl. No.: 09/638,601

(22) Filed: Aug. 15, 2000

(30) Foreign Application Priority Data

Aug. 7, 2000 (TW) .................................. 89115833 A (51) Int. Cl.$^7$ .............................. G01F 1/22; G01F 3/24
(52) U.S. Cl. ...................................... 73/861.57; 73/224
(58) Field of Search .............................. 73/861.57, 224; 340/606

(56) References Cited

U.S. PATENT DOCUMENTS

| | | | | | |
|---|---|---|---|---|---|
| 3,582,662 | A | * | 6/1971 | Soika | 250/222.1 |
| 3,662,598 | A | * | 5/1972 | Spencer | 73/861.05 |
| 4,091,671 | A | * | 5/1978 | McLees | 73/313 |
| 4,142,486 | A | * | 3/1979 | Schreier | 123/73 AD |
| 4,523,464 | A | * | 6/1985 | Pedersen et al. | 73/216 |
| 4,550,314 | A | * | 10/1985 | Stenzel et al. | 73/861.56 |
| 4,864,870 | A | * | 9/1989 | Payne et al. | 73/861.56 |
| 5,142,271 | A | * | 8/1992 | Bailey et al. | 73/861.56 |

* cited by examiner

*Primary Examiner*—Edward Lefkowitz
*Assistant Examiner*—Lilybett Martir
(74) *Attorney, Agent, or Firm*—J. C. Patents (57) ABSTRACT

A flow sensing system capable of improving the monitored range of a flow sensing system. The flow sensing system has a transparent tube, an upper edge sensing assembly, a lower edge sensing assembly and a floating buoy. Under normal operating conditions, the lower edge sensing assembly detects the buoy exactly once during a first timing session, detects no buoy during a second timing session and detects the buoy exactly once during a third timing session. If one of the conditions is violated, a warning signal is issue to a station operator. The upper edge sensing assembly should not detect the buoy throughout the three timing sessions; otherwise, an abnormality has occurred and a warning signal is sent to the station operator. The sensing system prevents the size and length of buoy from interfering with the monitored range so that a more stable flow system is maintained.

4 Claims, 7 Drawing Sheets

METHOD FOR IMPROVING MONITORED RANGE OF FLOW SENSOR

CROSS-REFERENCE TO RELATED APPLICATION

This application claims the priority benefit of Taiwan application serial no. 89115833, filed Aug. 7, 2000.

BACKGROUND OF THE INVENTION

1. Field of Invention

The present invention relates to a method for improving the monitored range of a flow sensor. More particularly, the present invention relates to a flow sensing system capable of monitoring a more narrow range so that manufacturing stations can have a more stable supply of fluid.

2. Description of Related Art

Aside from some very special gases or solvents, most stations for manufacturing semiconductors require supply chilling water or gaseous nitrogen. Consequently, fluid control is important for carrying out special types of reactions as well as operating most processing machines.

The most convenient and direct means of controlling fluid is to measure its flow rate. Because different types of gases or liquids are used in different semiconductor processing stations, many types of fluid flow monitoring and controlling systems are manufactured in the semiconductor industry.

Figure 1A:
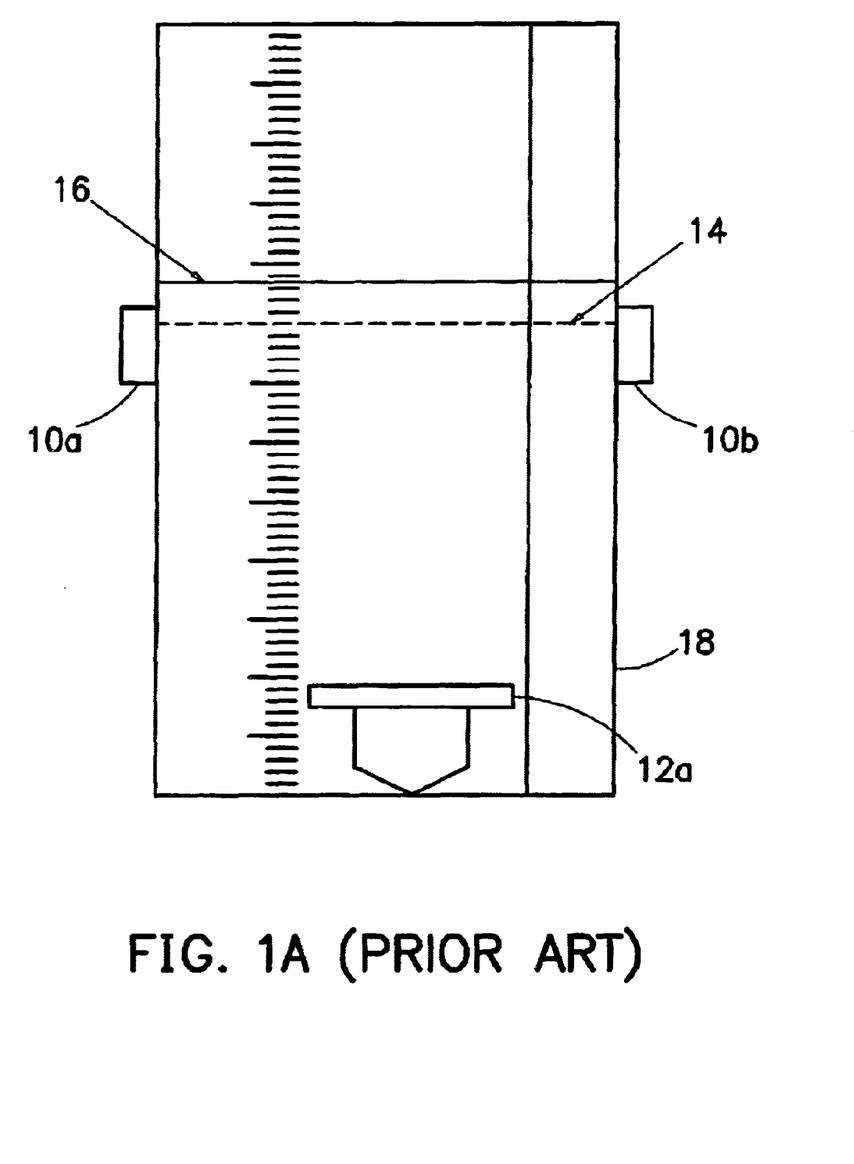
FIGS. 1A–1D are sketches of a conventional flow sensing system.

FIGS. 1A–1D is a sketch of a conventional flow sensing system. As shown in FIG. 1A, the flow sensor includes a transparent tube 18 having a marking at a definite height. The marking 16 is located at the target flow level. A group of sensors 10a and 10b are attached to the exterior sidewall of the transparent tube 18. The sensors 10a and 10b operate as a light-block sensing system.

Refer to FIG. 1A, for example, a beam of light 14 emitted from the light sensor 10a on one side of the transparent tube aims at the sensor 10b on the opposite side of the tube 18. The sensors 10a and 10b are positioned at a level of about 80% of the height of the target flow rate 16. The sensing system also includes a floating buoy 12 inside the transparent tube 18. The position of this floating buoy inside the transparent tube 18 indicates the current flow rate.

Figure 1B:
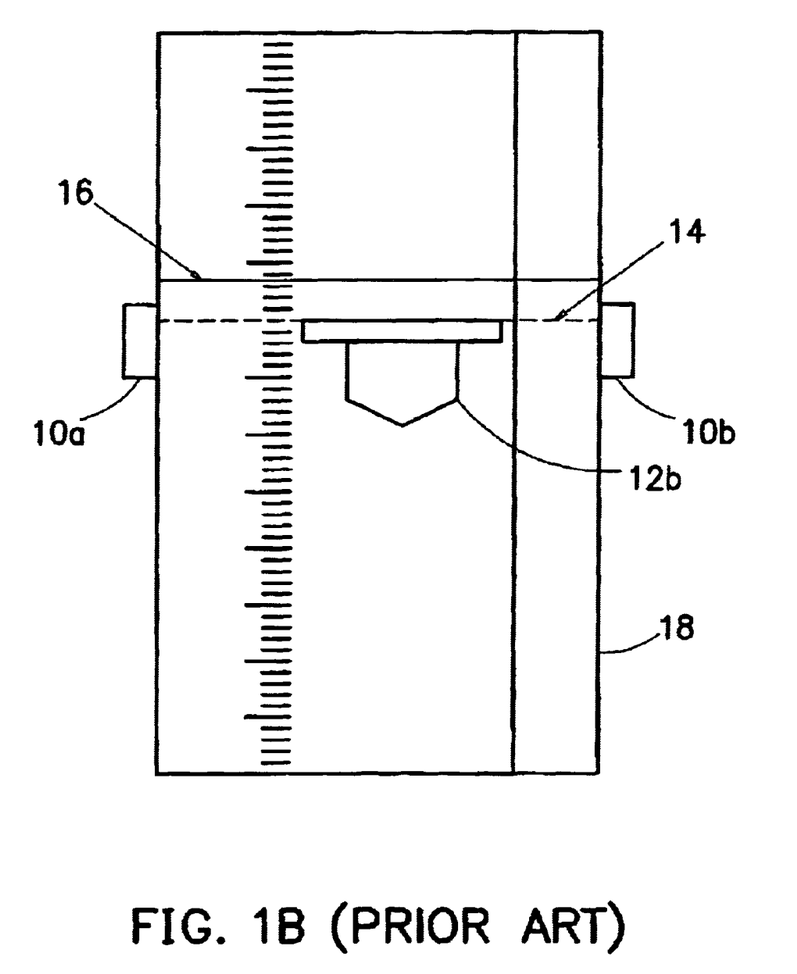

Before a particular manufacturing process is carried out, as shown in FIG. 1B, fluid must be fed to the operating station via the transparent tube 18. Fluid flow rate is indicated by the height level of the floating buoy 12 inside the transparent tube 18. In other words, the higher the floating buoy 12, the greater the fluid flow rate will be. When the floating buoy 12 reaches a level at about 80% of the target value 16, light 14 sent from the light source 10a will be blocked by the buoy 12.

Figure 1C:
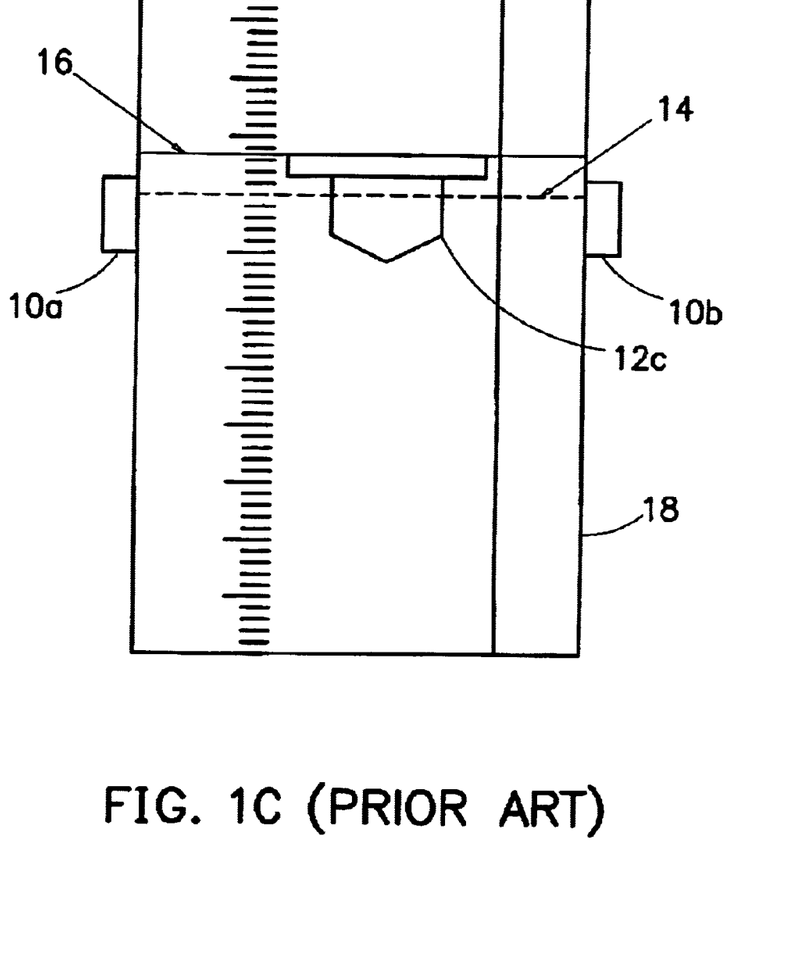
Figure 1D:
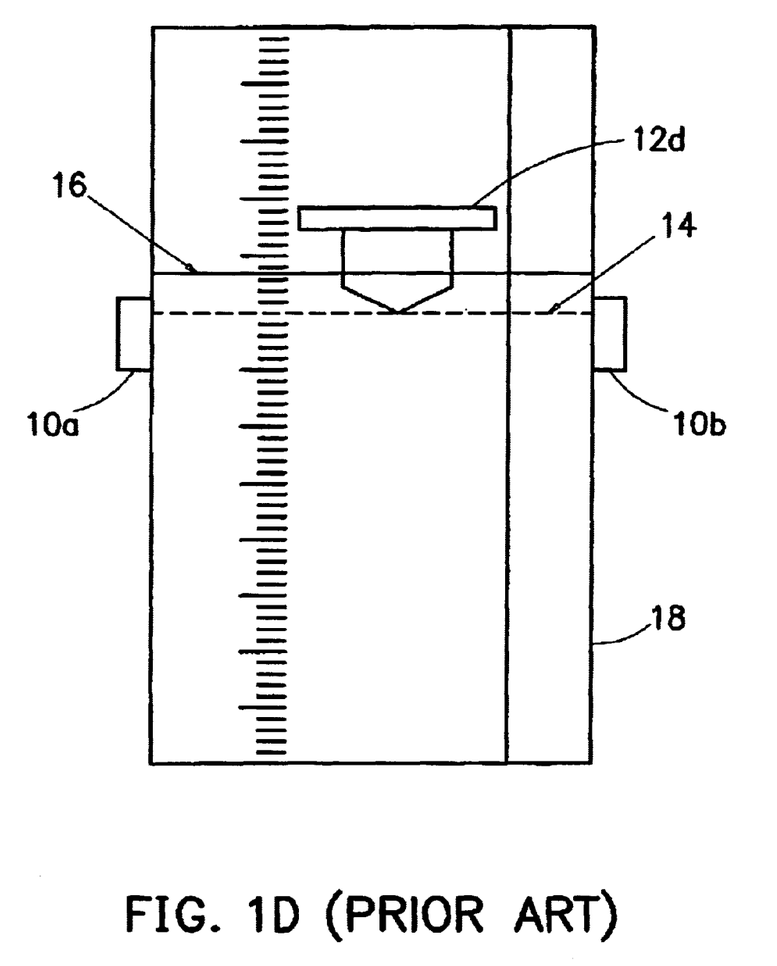

Refer to FIG. 1C, As an increase in flow rate causes the floating buoy 12 to rise further such that a top side of the buoy 12 will reach the level of the target value 16. In the stage, the flow rate reaches the target value 16. Refer to FIG. 1D, as an increase in flow rate causes the floating buoy 12 to rise further such that the buoy 12 surpasses a level of about 130% of the target value 16, light from the light source 10a is still blocked by a button portion of the buoy 12.

When emitted light from light source 10a is blocked, this indicates the current flow rate is within the correct range. Conversely, any unimpeded light from light source 10a to the light sensor 10b indicates an out of range condition. That means, either too little fluid (as shown in FIG. 1B) or too much fluid (as shown in FIG. 1D) is passed to the processing station. When an out of range condition occurs, an alarm next to the machine is triggered warning an operator to pay attention to the situation before something serious happens to the processing station or the items inside the station.

Figure 2:
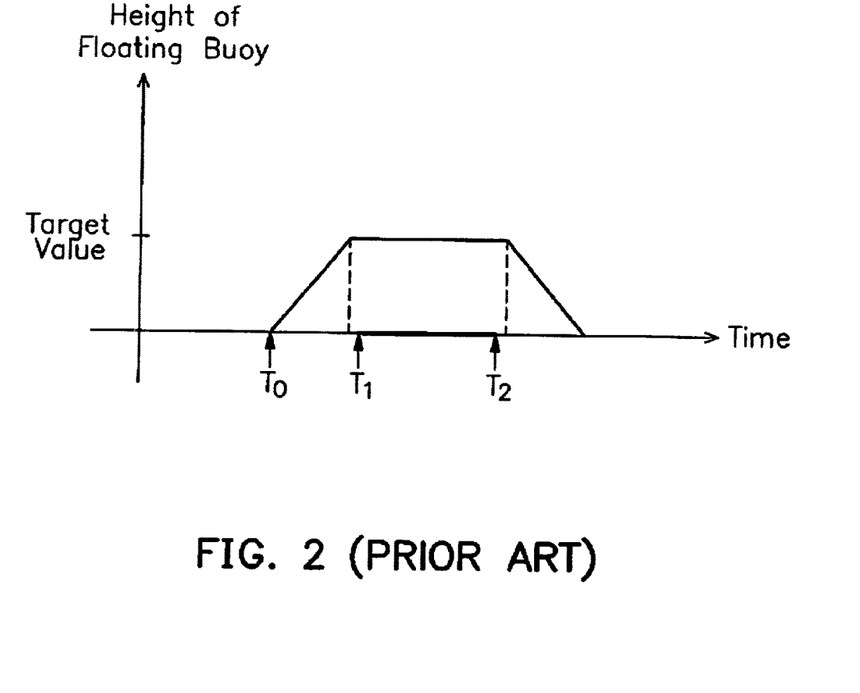
FIG. 2 is a timing chart showing the fluid flow condition in a conventional flow sensing system.

FIG. 2 is a timing chart showing the fluid flow condition in a conventional flow sensing system. At time $T_0$, the floating buoy rises gradually indicating the flow rate is also increasing. When the floating buoy reaches 80% of the target value, a waiting period is set aside for the fluid flow to stabilize. At time $T_1$, the floating buoy reaches the target value and hence the sensing system starts monitoring the fluid flow. The monitoring continues until time $T_2$. In other words, the sensing system must detect the presence of the floating buoy within the period $T_1$~$T_2$, which indicates that the fluid flows within the permissible range. On the other hand, if the sensing system does not detect the floating buoy within the period $T_1$~$T_2$, fluid flow is either too slow or too fast. In that case, an alarm is triggered to warn the personnel before irreversible damages are done.

At a pre-defined period after time $T_2$, fluid flow will gradually fall to zero. If the floating buoy is at a position under 80% of target value, the sensing system detects no buoy. Conversely, if the floating buoy can still be detected by the sensing system, the fluid is still flowing at a considerable rate. Since this is an indication of some malfunction, an alarm is also triggered to inform the operator about this situation.

In general, a conventional flow sensor is limited by rocking stability of the floating buoy. Hence, the sensor is normally set to action at about 80% of the target value to prevent accidental tripping of a machine due to the rocking motion. However, due to considerations such as the size and length of a buoy, the actual controlling range is between 80% to 130% or even higher. That means, it is difficult to tailor a conventional fluid monitoring system to achieve a more narrow monitoring range and higher stability.

SUMMARY OF THE INVENTION

Accordingly, one object of the present invention is to provide a flow sensing system capable of monitoring a more narrow range (as little as 85% to 115%) so that stability demanded by the processing operation is improved.

To achieve these and other advantages and in accordance with the purpose of the invention, as embodied and broadly described herein, the invention provides a method of improving the monitored range of a flow sensing system. First, a target flow value, an upper limit and a lower limit are set. The flow rate is sensed in a first timing session. The detected flow rate is considered normal if the value reaches the lower limit within the first timing session. The flow rate is sensed in a second timing session. The detected flow rate is considered normal if the value reaches a level higher than the lower limit within the second time period. The flow rate is sensed in a third timing session. The detected flow rate is considered normal if the value drops to zero before the end of the third timing session. Throughout the whole process, the flow rate must not exceed the upper limit.

This invention also provides a flow sensing system capable of improving the monitored range. The system includes a transparent tube, a lower edge sense device, an upper edge sense device and a floating buoy. The transparent tube serves as a fluid flow monitor. A target value, an upper limit and a lower limit are marked on the transparent tube at suitable locations. The lower edge sense device is attached to the external sidewall of the transparent tube coinciding with the lower limit mark. The upper edge sense device is attached to the external sidewall of the transparent tube coinciding with the upper limit mark. The floating buoy is placed inside the transparent tube subjected to the pressure provided by a moving fluid.

The floating buoy indicates fluid flow rate. Under normal operating conditions, the lower edge sense device should be able to detect the floating buoy only once in a first timing session; the lower edge sense device should not detect the floating buoy at all in a second timing session; and the lower edge sense device should be able to detect the floating buoy only once in a third timing session. Meanwhile, under normal operating conditions, the upper edge sense device should not detect the floating buoy at all in any of the timing sessions.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 3:
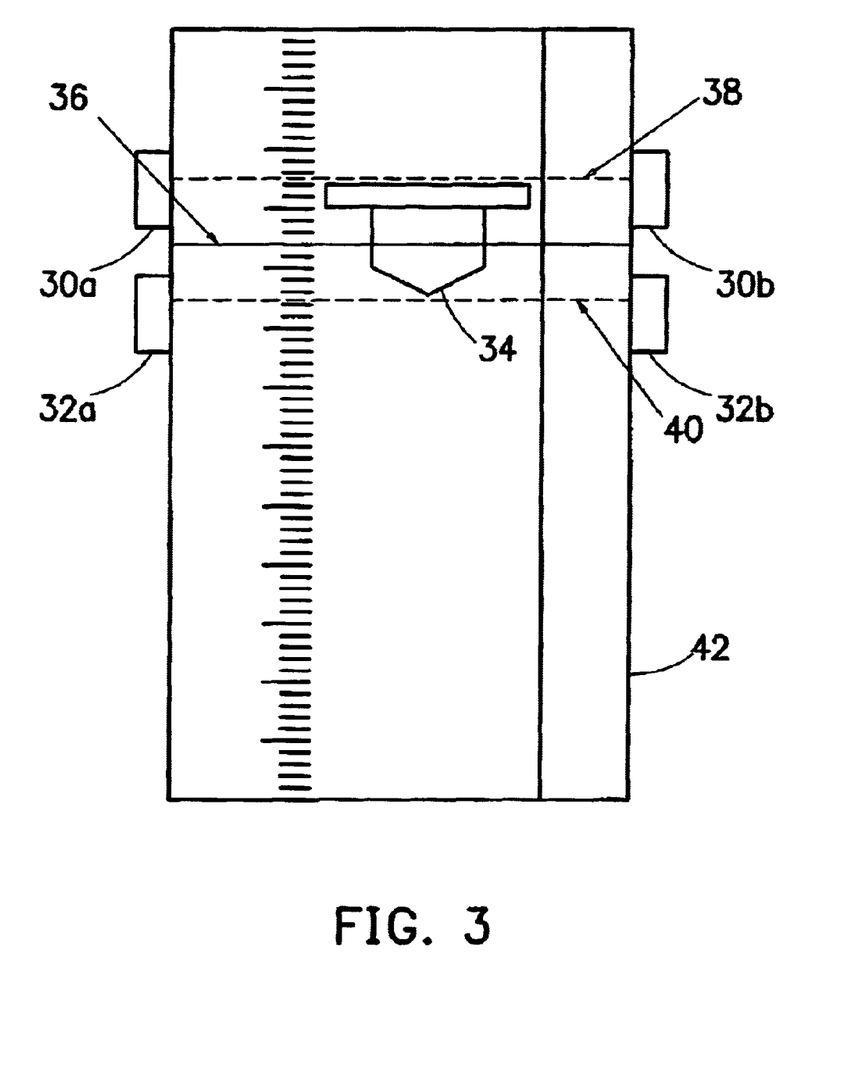
FIG. 3 is a sketch of a flow sensing system according to a preferred embodiment of this invention.

FIG. 3 is a sketch of a flow sensing system according to a preferred embodiment of this invention. As shown in FIG. 3, a target value 36 is marked at a certain height on a transparent tube 42. An upper edge sensing assembly and a lower edge sensing assembly are attached respectively to the external sidewall, one at a higher level while the other is at a lower level of the transparent tube 42. The upper edge sensing assembly includes a light emitter 30a and a light interceptor 30b, and the lower edge sensing assembly includes a light emitter 32a and a light interceptor 32b. Both the upper and the lower edge sensing assemblies are examples of a light-blocking detection system. For example, the light emitter 30a of the upper edge sensing assembly is able to emit a light beam 38 aimed at the light interceptor 30b at the opposite side of the transparent tube 42. The upper edge sensing assembly is fixed at a certain height when the flow rate is at about 115% of the target value 36, for example. Similarly, the light emitter 32a of the lower edge sensing assembly is able to emit a light beam 40 aimed at the light interceptor 32b at the opposite side of the transparent tube 42. The lower edge sensing assembly is fixed at a certain height when the flow rate is at about 85% of the target value 36, for example. A floating buoy 34 is placed inside the transparent tube 42 to indicate the actual flow rate.

The floating buoy 34 is an indicator of the flow rate to a particular processing station when the processing station is in use. As the flow rate increases, the higher the position of the floating buoy 34 will be. When the floating buoy 34 reaches about 85% of the target value 36, the buoy 34 blocks light emitted from the light beam 40 produced by the light emitter 32a of the lower edge sensing assembly. If the flow rate is permitted to rise, eventually the floating buoy 34 will reach 115% of the target value 36. When that happens, the light beam 38 produced by the light emitter 30a of the upper edge sensing assembly will be blocked.

For example, if the lower edge sensing assembly 32a, 32b does not detect the buoy 34 by the end of a definite timing session, this indicates the flow rate has not reached 85% of the target flow rate 36. If the lower edge sensing assembly 32a detects the buoy 34 more than once within a definite timing session, this indicates the flow rate is still rather unstable. If the upper edge sensing assembly 32a, 32b is able to detect the buoy 34 one or more times within a timing session, this indicates the flow rate rises to more than 115% of the target flow rate 36. Under all of the above conditions, a warning signal is sent to the station operator to prevent any possible damage to the machine or processing items.

Figure 4:
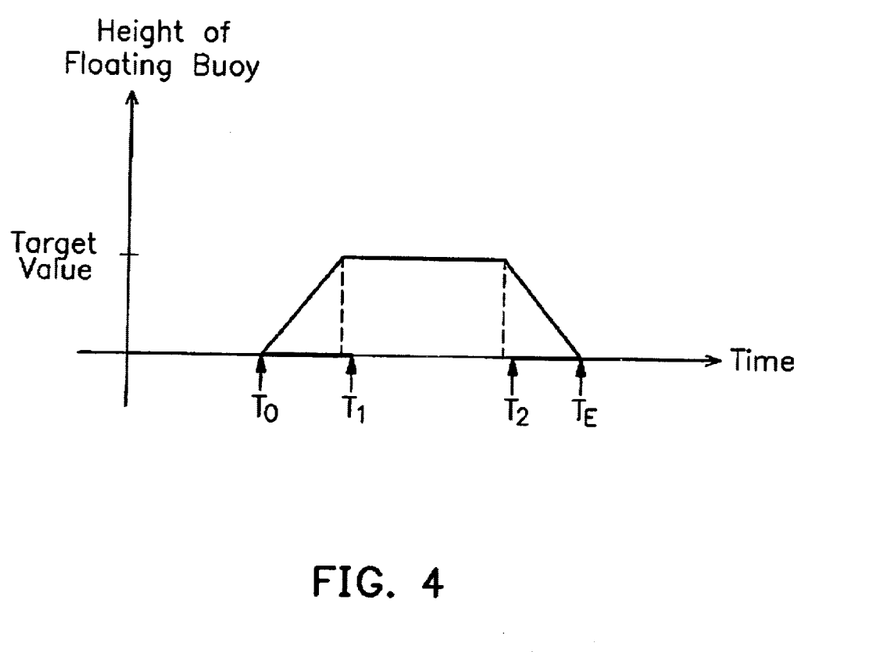
FIG. 4 is a timing chart showing the fluid flow condition according to this invention.

FIG. 4 is a timing chart showing the fluid flow condition according to this invention. At time $T_0$, the floating buoy begins to rise indicating an increase in fluid flow. When the buoy reaches a level at about 85% of the target flow 36, the lower edge sensing assembly is able to detect the buoy once. A preset delay period is set aside for the state of flow to stabilize. Within the timing session $T_0$~$T_1$, the lower edge sensing assembly should detect the presence of the buoy exactly once. If the lower edge sensing assembly does not detect the buoy or detects the buoy more than once, a warning signal is sent to the station operator indicating an abnormal flow.

The period between $T_1$~$T_2$ is the monitoring session. As the floating buoy reaches the target flow rate or a flow rate between the upper and lower limit, the buoy should no longer be detected by either the lower edge sensing assembly or the upper edge sensing assembly. If the lower edge sensing assembly detects the buoy, this indicates the flow rate falls to below 85% of the target flow rate. On the other hand, if the upper edge sensing assembly detects the buoy, this indicates the flow rate rises to more than 115% of the target flow rate. Under both circumstances, the flow rate is outside the normal rate for operating a processing station. Therefore, a warning signal is sent to the station operator to stop the machine before any irreversible damages occur.

After the completion of a manufacturing process, a definite delay is allowed for the flow rate to drop to zero. In the period between $T_2$ to $T_E$, the lower edge sensing assembly must be able to detect the buoy one more time indicating the gradual decrease of fluid flow. If the buoy is not detected by the lower edge sensing assembly, this indicates the flow rate is still maintained. Hence, a warning signal is again sent to the station operator so that such an abnormality can be corrected.

One major aspect of this invention includes the installation of an additional sensing assembly on a conventional flow sensing system. By using an upper and a lower edge sensing assembly, the range for monitoring of fluid flow is narrowed. Since an upper and a lower edge sensing assembly are used together, flow sensing is no longer limited by the size and length of the floating buoy. Hence, the invention is capable of monitoring a smaller flow range and providing greater processing stability.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for monitoring a flow rate in a flow sensing system, the method comprising:

setting a lower flow-rate sensing level and an upper flow-rate sensing level for the flow rate;

setting a first sensing period, a second sensing period and a third sensing period, wherein the flow rate is brought up during the first sensing period, the flow rate reaches a desired level during the second sensing period, and the flow rate is brought down during the third sensing period;

detecting the flow rate with detecting conditions, wherein the detection conditions include that: the flow rate crosses the lower flow-rate sensing level exactly once during the first sensing period, the flow rate does not cross the lower flow-rate sensing level during the second sensing period, the flow rate crosses the lower flow-rate sensing level exactly once during the third sensing period, and the flow rate never crosses the upper flow-rate sensing level during the three sensing periods; and issuing an abnormal signal if the flow rate violates the detecting conditions.

2. The method of claim 1, wherein the lower flow-rate sensing level is about 85% of the desired level.

3. The method of claim 1, wherein the upper flow-rate sensing level is about 115% of the desired level.

4. The method of claim 1, wherein the lower flow-rate sensing level is about 85% of the desired level and the upper flow-rate sensing level is about 115% of the desired level.

* * * * *